US009142359B2

(12) United States Patent
Taira et al.

(10) Patent No.: US 9,142,359 B2
(45) Date of Patent: Sep. 22, 2015

(54) ELECTRODE MATERIAL FOR ALUMINUM ELECTROLYTIC CAPACITOR AND PROCESS FOR PRODUCING THE ELECTRODE MATERIAL

(75) Inventors: Toshifumi Taira, Osaka (JP); Masashi Mehata, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 0 days.

(21) Appl. No.: 12/988,405

(22) PCT Filed: Apr. 22, 2008

(86) PCT No.: PCT/JP2008/057782
§ 371 (c)(1),
(2), (4) Date: Oct. 18, 2010

(87) PCT Pub. No.: WO2009/130765
PCT Pub. Date: Oct. 29, 2009

(65) Prior Publication Data
US 2011/0038098 A1 Feb. 17, 2011

(51) Int. Cl.
*H01G 9/052* (2006.01)
*H01G 9/045* (2006.01)

(52) U.S. Cl.
CPC .............. *H01G 9/052* (2013.01); *H01G 9/045* (2013.01); *Y10T 29/417* (2015.01)

(58) Field of Classification Search
CPC ..... H01G 9/052; H01G 9/045; H01G 9/0525; H01G 9/055; Y10T 29/417
USPC .................................. 361/508, 509, 528, 529
See application file for complete search history.

(56) References Cited

U.S. PATENT DOCUMENTS

| 3,004,332 | A | * | 10/1961 | Werner ...................... 428/539.5 |
| 3,196,323 | A | * | 7/1965 | Rogers et al. ................. 361/509 |
| 3,258,826 | A | * | 7/1966 | Boone et al. ................. 29/25.03 |
| 3,732,470 | A | * | 5/1973 | Robinson ...................... 361/523 |
| 4,633,373 | A |   | 12/1986 | Phillips |
| 4,888,666 | A | * | 12/1989 | Naitoh et al. ................. 361/512 |
| 4,907,130 | A | * | 3/1990 | Boulloy et al. ............... 361/529 |
| 5,473,503 | A | * | 12/1995 | Sakata et al. .................. 361/525 |
| 6,785,123 | B2| * | 8/2004 | Keser ............................ 361/509 |

(Continued)

FOREIGN PATENT DOCUMENTS

DE 4127743 A1 * 3/1993
JP 61-184812 A 8/1986

(Continued)

OTHER PUBLICATIONS

Chen, Guoguang; "Aluminum Electrolytic Capacitor"; Xian Jiatong University Press, Oct. 1986, pp. 184-197. (cited in Chinese Office Action dated Dec. 21, 2011) partial English translation.

(Continued)

Primary Examiner — David M Sinclair
(74) Attorney, Agent, or Firm — Westerman, Hattori, Daniels & Adrian, LLP

(57) ABSTRACT

The present invention provides an electrode material for use in an aluminum electrolytic capacitor that does not necessitate an etching treatment. Specifically, the present invention provides an electrode material for use in an aluminum electrolytic capacitor, the electrode material comprising a sintered body of at least one of aluminum and an aluminum alloy.

6 Claims, 1 Drawing Sheet

(56) References Cited

U.S. PATENT DOCUMENTS

| | | | |
|---|---|---|---|
| 6,873,518 B2 * | 3/2005 | Masuda et al. | 361/525 |
| 6,914,769 B2 * | 7/2005 | Welsch et al. | 361/508 |
| 7,320,714 B2 * | 1/2008 | Keser | 29/25.03 |
| 7,388,740 B2 | 6/2008 | Ro et al. | |
| 7,456,073 B2 * | 11/2008 | Fife et al. | 438/381 |
| 7,760,489 B2 * | 7/2010 | Fujita et al. | 361/528 |
| 8,213,159 B2 * | 7/2012 | Imanaka et al. | 361/523 |
| 2006/0028787 A1 | 2/2006 | Yoshida et al. | |
| 2006/0204735 A1 | 9/2006 | Naito | |
| 2009/0021894 A1 | 1/2009 | Ning et al. | |
| 2011/0038098 A1 | 2/2011 | Taira et al. | |
| 2011/0053764 A1 | 3/2011 | Taira et al. | |
| 2012/0094016 A1 | 4/2012 | Taira et al. | |
| 2012/0219817 A1 | 8/2012 | Konishi et al. | |
| 2014/0098460 A1 | 4/2014 | Taira et al. | |
| 2014/0211375 A1 | 7/2014 | Taira et al. | |

FOREIGN PATENT DOCUMENTS

| | | | |
|---|---|---|---|
| JP | 63-124511 A | | 5/1988 |
| JP | 02-091918 A | | 3/1990 |
| JP | 2-091918 A | | 3/1990 |
| JP | 02-267916 A | | 11/1990 |
| JP | 9-167720 A | | 6/1997 |
| JP | 11199992 A | * | 7/1999 |
| JP | 2000-012400 A | | 1/2000 |
| JP | 2004-336018 A | | 11/2004 |
| JP | 2004-343096 A | | 12/2004 |
| JP | 2004-363491 A | | 12/2004 |
| JP | 2006-049760 A | | 2/2006 |
| JP | 2006-108159 A | | 4/2006 |
| JP | 2006186248 A | * | 7/2006 |
| JP | 2008-098279 A | | 4/2008 |
| JP | 2011-052291 A | | 3/2011 |
| JP | 2011-74468 A | | 4/2011 |
| WO | 2004-088690 A1 | | 10/2004 |
| WO | 2007/091656 A1 | | 8/2007 |
| WO | 2010/146973 A1 | | 12/2010 |

OTHER PUBLICATIONS

International Search Report of PCT/JP2008/057782, mailing date Jul. 29, 2008.

Chen, "Solid Aluminum Electrolytic Capacitor", Xian Jiatong University Press, dated Oct. 1986, p. 153 cited in Chinese Office Action dated Oct. 30, 2012. With Partial English Translation.

Chen, "Electrolytic Capacitor", Xi'an Jiatong University Press, Oct. 1986, p. 184-197 (cited in Chinese Office Action dated Dec. 21, 2011); w/ partial English Translation (7 pages).

International Search Report dated Mar. 12, 2013, issued in corresponding Application No. PCT/JP2013/052857, issued in co-pending U.S. Appl. No. 14/375,884 (2 pages).

International Search Report dated in Oct. 16, 2012, issued in corresponding Application No. PCT/JP2012/067653, issued in co-pending U.S. Appl. No. 14/232,770 (2 pages).

U.S. Non-Final Office Action dated Jan. 22, 2015, issued in co-pending U.S. Appl. No. 14/375,884 (14 pages).

International Search Report dated Aug. 14, 2012, issued in corresponding Application No. PCT/JP2012/062927, issued in co-pending U.S. Appl. No. 14/122,038.

Chen, "Liquid Electrolyte Sintered Tantalum Capacitor", Xian Jiatong University Press, Oct. 1986, p. 153 (cited in Chinese Office Action dated Oct. 30, 2012); w/ partial English Translation (3 pages).

Chinese Office Action dated Dec. 21, 2011, issued in corresponding Chinese Patent Application No. 200880128783.4.

* cited by examiner

ELECTRODE MATERIAL FOR ALUMINUM ELECTROLYTIC CAPACITOR AND PROCESS FOR PRODUCING THE ELECTRODE MATERIAL

TECHNICAL FIELD

The present invention relates to an electrode material used in an aluminum electrolytic capacitor, particularly a positive electrode material used in a medium- to high-voltage aluminum electrolytic capacitor, and a method for producing the electrode material.

BACKGROUND ART

Aluminum electrolytic capacitors are widely used because they allow a high capacity to be achieved at a low cost. Aluminum foil is generally used as an electrode material for an aluminum electrolytic capacitor.

The surface area of the electrode material for an aluminum electrolytic capacitor can usually be increased by performing an etching treatment to form etching pits. The etched surface of the electrode material is then anodized to obtain an oxide film that functions as a dielectric substance. By etching the aluminum foil and applying one of various voltages to the surface thereof to match the voltage that is to be used, an anodic oxide film can be formed, thus enabling various aluminum anodes (foils) to be produced for electrolytic capacitors that are suited to specific applications.

In the etching process, pores called etching pits are formed in the aluminum foil, and the etching pits are processed into various shapes depending on the anodization voltage to be applied.

More specifically, a thick oxide film must be formed for use in medium- to high-voltage capacitors. Therefore, in order to prevent the etching pits from being buried by such a thick oxide film, the etching pits for an aluminum foil that is to be used in a medium- to high-voltage anode are made to a tunnel type by conducting direct-current etching, and then processed to have an appropriate size for the voltage that is to be used. In contrast, small etching pits are necessary for use in low-voltage capacitors. Therefore, sponge-like etching pits are generally formed by alternating-current etching. In a cathode foil, the surface area is similarly increased by etching.

However, the etching treatments for both anodes and cathodes require the use of an aqueous hydrochloric acid solution that contains sulfuric acid, phosphoric acid, nitric acid, etc., in hydrochloric acid. Hydrochloric acid has a strong environmental impact, and its disposal also impacts the production process or production cost. Therefore, the development of a novel method for increasing the surface area of an aluminum foil that does not require etching is in demand.

In order to meet this demand, the use of an aluminum electrolytic capacitor that is characterized by adhering a fine aluminum powder to the surface of an aluminum foil has been proposed (Patent Document 1). Another example of a known electrolytic capacitor is one that uses an electrode foil that comprises a flat aluminum foil having a thickness of not less than 15 µm but less than 35 µm, wherein an aggregate of self-similar aluminum fine particles having a length of 2 to 0.01 µm and/or an aggregate of aluminum fine particles having an aluminum oxide layer formed on the surface thereof are adhered to one or both surfaces of the flat aluminum foil (Patent Document 2).

However, the methods disclosed in the aforementioned documents, wherein aluminum powder is adhered to the aluminum foil by plating and/or vacuum evaporation, are insufficient, at least for obtaining thick etching pits for medium- to high-voltage capacitors.

Patent Document 1: Japanese Unexamined Patent Publication No. 2-267916
Patent Document 2: Japanese Unexamined Patent Publication No. 2006-108159

DISCLOSURE OF THE INVENTION

Problems to be Solved by the Invention

Accordingly, a primary object of the present invention is to provide an electrode material for an aluminum electrolytic capacitor, for which etching is not necessary.

Means for Solving the Problems

The present inventors conducted extensive research in view of the above-described problems of the prior art, and found that a specific sintered body can achieve the above object. The present invention was thus accomplished.

Specifically, the present invention relates to the following electrode material for an aluminum electrolytic capacitor, and a method for producing the electrode material.

Item 1. An electrode material for an aluminum electrolytic capacitor, the electrode material comprising a sintered body of at least one of aluminum and an aluminum alloy.

Item 2. The electrode material according to Item 1, wherein the sintered body is formed by sintering particles of at least one of aluminum and an aluminum alloy while maintaining a space between each particle.

Item 3. The electrode material according to Item 1, wherein the sintered body is a foil having an average thickness of not less than 5 µm and not more than 1,000 µm.

Item 4. The electrode material according to Item 1, which further comprises a substrate for supporting the electrode material.

Item 5. The electrode material according to Item 4, wherein the substrate is an aluminum foil.

Item 6. The electrode material according to Item 1, which is used in a medium- to high-voltage aluminum electrolytic capacitor.

Item 7. The electrode material according to Item 1, which is used as an electrode for an aluminum electrolytic capacitor without applying an etching treatment.

Item 8. A method for producing an electrode material for an aluminum electrolytic capacitor, the method comprising the steps of:
Step (1): forming a film made from a composition comprising a powder of at least one of aluminum and an aluminum alloy on a substrate; and
Step (2): sintering the film at a temperature not lower than 560° C. and not higher than 660° C.

Item 9. The production method according to Item 8, wherein the powder has an average particle diameter of not less than 1 µm and not more than 80 µm.

Item 10. The production method according to Item 8, wherein the composition comprises at least one member selected from the group consisting of resin binders and solvents.

Item 11. A method for producing an electrode for an aluminum electrolytic capacitor, the method comprising the steps of:
Step (1): forming a film made from a pasty composition comprising a powder of at least one of aluminum and an aluminum alloy on a substrate; and Step (2): sintering the film at a temperature not lower than 560° C. and not higher than 660° C.;
the method being free from an etching treatment.

Item 12. The production method according to Item 11, which further comprises Step (3): anodizing the sintered film.

Effect of the Invention

The present invention can provide an electrode material comprising a sintered body, which is different from a conventional electrode material (rolled foil) having etching pits. Such a sintered body particularly has a unique structure in which particles (particularly, aluminum or aluminum alloy powder particles) are sintered while a space is maintained between each particle. Because of this structure, an electrostatic capacity equivalent to or greater than that of a conventional etched foil can be obtained. Therefore, the present invention can be substituted particularly for an etched foil having thick etching pits for use in medium- to high-voltage capacitors.

Thus, the electrode material of the present invention, which can be used without etching, can solve all problems caused by hydrochloric acid used for etching (e.g., environmental problems and waste-contamination problems).

Moreover, although a conventional etched foil has a problem in which foil strength deteriorates because of etching pits, the electrode material of the present invention comprising a porous sintered body is advantageous in terms of strength.

Accordingly, the electrode foil of the present invention can be satisfactorily wound.

BEST MODE FOR CARRYING OUT THE INVENTION

1. Electrode Material for Aluminum Electrolytic Capacitor

The electrode material of the present invention is intended for use in an aluminum electrolytic capacitor, and is made from a sintered body of at least one of aluminum and aluminum alloy.

The sintered body is substantially composed of at least one member selected from the group consisting of aluminum and an aluminum alloy. The materials of such a sintered body may be the same composition as known rolled Al foils. For example, a sintered body of aluminum or a sintered body of an aluminum alloy can be used. The aluminum sintered body preferably comprises aluminum having a purity of 99.8 wt. % or more. Examples of aluminum alloy components include one or more elements selected from silicon (Si), iron (Fe), copper (Cu), manganese (Mn), magnesium (Mg), chromium (Cr), zinc (Zn), titanium (Ti), vanadium (V), gallium (Ga), nickel (Ni), boron (B), zirconium (Zr) and the like. The content of each of these elements is preferably not greater than 100 ppm by weight, and more preferably not greater than 50 ppm by weight.

Figure 1:
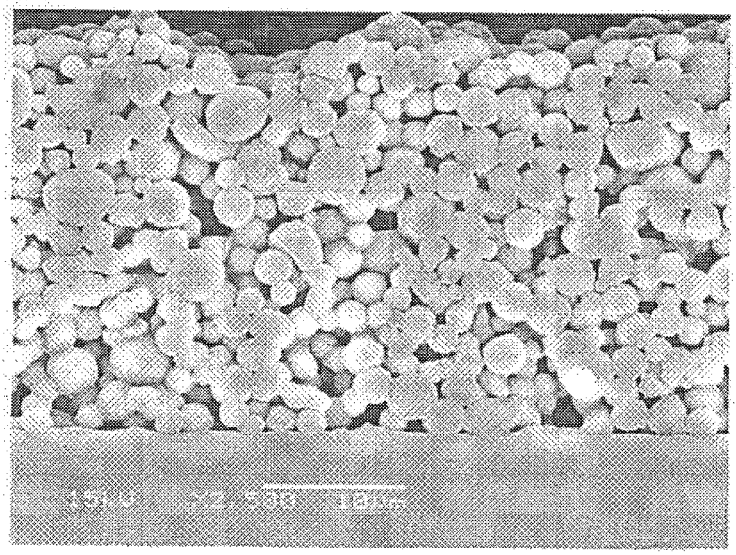
FIG. 1 shows an image of the cross section of an electrode material obtained in Example 1 observed with a scanning electron microscope.

It is preferable that the sintered body be obtained by sintering particles of at least one of aluminum and an aluminum alloy while maintaining a space between each particle. FIG. 1 shows an image of the cross section of the electrode material of the present invention observed with a scanning electron microscope. As shown in FIG. 1, the particles connect to each other while maintaining spaces between themselves to form a three-dimensional network. By employing such a porous sintered body, sufficient electrostatic capacity can be obtained without the need for etching. The porosity of the sintered body can be generally set to a level that is not less than 10% depending on the target electrostatic capacity, etc. Moreover, the porosity can be controlled by, for example, controlling the particle diameter of the aluminum or aluminum alloy powder, which is the starting material, the components (resin binders) of a paste composition that contains the powder, and the like.

There is no limitation on the shape of the sintered body; however, a foil-like shape generally having an average thickness of not less than 5 μm and not more than 1,000 μm, and preferably not less than 5 μm and not more than 50 μm is preferred. The average thickness is determined as the average value measured by the weight method.

The electrode material of the present invention may further contain a substrate that supports the electrode material. There is no limitation on the substrate; however, aluminum foil may be suitably employed.

There is no limitation on the aluminum foil that is used as a substrate, and pure aluminum or an aluminum alloy may be used. The aluminum foil used in the present invention includes aluminum alloys that contain a necessary amount of at least one alloy component selected from silicon (Si), iron (Fe), copper (Cu), manganese (Mn), magnesium (Mg), chromium (Cr), zinc (Zn), titanium (Ti), vanadium (V), gallium (Ga), nickel (Ni) and boron (B), and aluminum that contains a limited amount of the aforementioned elements as unavoidable impurities.

Although not limited thereto, the thickness of the aluminum foil is preferably not less than 5 μm and not more than 100 μm, and more preferably not less than 10 μm and not more than 50 μm.

An aluminum foil produced by a known method may be used as the aluminum foil of the present invention. Such an aluminum foil may be obtained by, for example, preparing a molten metal of aluminum or an aluminum alloy comprising the components described above, and casting the molten metal to obtain an ingot, followed by appropriate homogenization. Thereafter, the resulting ingot is subjected to hot rolling and cold rolling, thereby obtaining an aluminum foil.

During the aforementioned cold rolling process, intermediate annealing may be conducted at a temperature within a range of not lower than 50° C. to not higher than 500° C., preferably not lower than 150° C. to not higher than 400° C. Further, after the cold rolling process, annealing may be conducted at a temperature range of not lower than 150° C. to not higher than 650° C., and preferably not lower than 350° C. to not higher than 550° C. to obtain a soft foil.

The electrode material of the present invention may be used as a low-voltage, medium-voltage or high-voltage aluminum electrolytic capacitor. In particular, the electrode material is desirable for use as a medium-voltage or high-voltage (medium- to high-voltage) aluminum electrolytic capacitor.

When used as the electrode for an aluminum electrolytic capacitor, the electrode material of the present invention can be used without applying an etching treatment. More specifically, the electrode material of the present invention may be used as an electrode (electrode foil) as is or by only anodizing it, without the need for etching.

The anode foil using the electrode material of the present invention and a cathode foil can be laminated with a separator therebetween and wound to form a capacitor element, which is dipped into and impregnated with an electrolyte and then housed in a case, which is sealed with a sealing material to obtain an electrolytic capacitor.

2. Method for Producing Electrode Material for Aluminum Electrolytic Capacitor The method for producing the electrode material for an aluminum electrolytic capacitor of the present invention comprises the steps of:

Step (1): forming a film made from a composition comprising at least one of an aluminum powder and an aluminum alloy powder on a substrate; and Step (2): sintering the film at a temperature not lower than 560° C. and not higher than 660° C.

Step 1

In Step 1, a film made from a composition comprising at least one of an aluminum powder and an aluminum alloy powder is formed on a substrate.

The aforementioned compositions (components) of aluminum and an aluminum alloy can be used. A preferred example of the powder is a pure aluminum powder having a purity of 99.8 wt. % or more.

There is no limitation on the shape of the powder, and a spherical, shapeless, scaly, fibrous, or other shape may be suitably used. Particularly, a powder of spherical particles is preferred. The average particle diameter of the spherical particle powder is preferably not less than 1 μm and not more than 80 μm, and more preferably not less than 1 μm and not more than 30 μm. When the average particle diameter is less than 1 μm, a satisfactory withstand voltage may not be obtained. Conversely, when the average particle diameter is more than 80 μm, a satisfactory electrostatic capacity may not be obtained.

A powder produced by a known method may be used as the powder described above. Examples of employable methods include an atomizing method, a melt spinning method, a rotating disk method, a rotating electrode method, and other rapid solidification methods; in terms of industrial production, an atomizing method is preferred, and a gas atomizing method is particularly preferred. More specifically, a powder obtained by atomizing molten metal is preferably used.

The composition may contain, if necessary, resin binders, solvents, sintering aids, surfactants, etc. For these, known or commercially available products can be used. In the present invention, the composition is preferably used as a pasty composition comprising at least one member selected from the group consisting of resin binders and solvents. Using such a pasty composition enables the efficient formation of a film. Resin binders are not limited, and suitable examples thereof include carboxy-modified polyolefin resins, vinyl acetate resins, vinyl chloride resins, vinyl chloride-vinyl acetate copolymers, vinyl alcohol resins, butyral resins, polyvinyl fluoride, acrylic resins, polyester resins, urethane resins, epoxy resins, urea resins, phenol resins, acrylonitrile resins, nitrocellulose resins, parafin wax, polyethylene wax, and other synthetic resins or waxes; and tar, glue, sumac, pine resin, beeswax, and other natural resins or waxes. These binders are divided into, depending on the molecular weight, the type of resin, etc., those that volatilize upon heating and those that remain as a residue together with aluminum powder as a result of pyrolysis. They can be used depending on the desired electrostatic characteristics, etc.

Moreover, any known solvents may be used. For example, water as well as organic solvents, such as ethanol, toluene, ketones, and esters, may be used.

The method of forming a film may be suitably selected from known methods depending on the properties of the composition, etc. For example, when the composition is a powder (solid), its green compact may be formed (or thermocompression-bonded) on a substrate. In this case, while the green compact is solidified by sintering, the aluminum powder can also be fixed onto a sheet material. When the composition is in liquid (paste) form, a film can be formed by rolling, brushing, spraying, dipping or a like coating method, or by a known printing method.

The film may be dried at a temperature within a range of not lower than 20° C. to not higher than 300° C., if necessary.

There is no limitation on the thickness of the film; however, the thickness is generally not less than 20 μm and not more than 1,000 μm, and more preferably not less than 20 μm and not more than 200 μm. When the thickness is less than 20 μm, a satisfactory electrostatic capacity may not be obtained. Conversely, when the thickness is greater than 1,000 μm, adhesion of the film to the foil may be insufficient, and cracks may be generated in a subsequent step.

The material of the substrate is not limited, and metal, resin, etc., may be used. In particular, when only the film is left by volatilizing the substrate during sintering, a resin (resin film) can be used. On the other hand, when the substrate is left, a metal foil can suitably be used. An aluminum foil is particularly suitable for use as a metal foil. When an aluminum foil is used, its composition may be different from or substantially the same as that of the film. Prior to the formation of the film, the surface of the aluminum foil may be roughened. The surface roughening method is not limited, and any known technique, such as washing, etching, blasting, etc., may be employed.

Step 2

In Step 2, the film is sintered at a temperature not lower than 560° C. and not higher than 660° C.

The sintering temperature is not lower than 560° C. and not higher than 660° C., preferably not lower than 560° C. but lower than 660° C., and more preferably not lower than 570° C. and not higher than 659° C. The sintering time, which varies depending on the sintering temperature, etc., can be suitably determined generally within a range of about 5 to 24 hours.

The sintering atmosphere is not limited and may be selected from a vacuum atmosphere, an inert gas atmosphere, an oxidizing gas atmosphere (air), a reducing atmosphere, etc.; in particular, a vacuum atmosphere or a reducing atmosphere is preferred. The pressure conditions are also not limited, and a normal pressure, a reduced pressure, or an increased pressure may be employed.

When the composition contains a resin binder or like organic component, it is preferable to conduct a heat treatment (degreasing treatment) after Step 1 but prior to Step 2, at a temperature within a range of not lower than 100° C. to not higher than 600° C. in such a manner that the temperature range is maintained for not less than 5 hours. The heating atmosphere is not limited and may be selected from a vacuum atmosphere, an inert gas atmosphere, or an oxidizing gas atmosphere. The pressure conditions are also not limited, and a normal pressure, a reduced pressure, or an increased pressure may be employed.

Step 3

The electrode material of the present invention can be obtained in Step 2 described above. The electrode material can be directly used as an electrode (electrode foil) for an aluminum electrolytic capacitor without etching. Alternatively, the electrode material of the present invention may be anodized in Step 3, if necessary, to form a dielectric, which is used as the electrode material.

There is no limitation on the anodization conditions; however, the anodization may generally be conducted by applying a current of about not less than 10 mA/cm$^2$ and not more than 400 mA/cm$^2$ to the electrode material for not less than 5 minutes in a boric acid solution with a concentration of not less than 0.01 mol and not more than 5 mol at a temperature of not lower than 30° C. and not higher than 100° C.

EXAMPLES

The present invention is described in more detail below with reference to a conventional example and an example. However, the scope of the present invention is not limited to the example.

Electrode materials were prepared below according to the conventional example and the example.

Conventional Example 1

A 130-μm-thick aluminum foil (JIS A1080-H18) was subjected to an etching treatment under the following conditions, and the etched aluminum foil was washed and dried, thereby producing an electrode material.
Primary Etching
Etchant: a mixture of hydrochloric acid and sulfuric acid (hydrochloric acid concentration: 1 mol/L, sulfuric acid concentration: 3 mol/L, 80° C.)
Electrolysis: DC 500 mA/cm$^2$×1 min
Secondary Etching
Etchant: a nitric acid solution (nitric acid concentration: 1 mol/L, 75° C.)
Electrolysis: DC 100 mA/cm$^2$×5 min Example 1

An aluminum powder having an average particle diameter of 5.5 μm (60 parts by weight; JIS A1080, manufactured by Toyo Aluminium K.K., product number: AHU57E9) was mixed with 40 parts by weight of acrylic binder, and the mixture was dispersed in a solvent (toluene) to obtain a coating solution having a solids content of 60 wt. %. The coating solution was applied to one side of a 30-μm-thick aluminum foil (JIS 1N30-H18) using a 9-mil applicator, and the resulting film was dried. This aluminum foil was sintered in an argon gas atmosphere at a temperature of 655° C. for 7 hours, thereby producing an electrode material. The thickness of the electrode material after sintering was about 130 μm.

Test Example 1

The electrostatic capacity of each of the electrode materials obtained in the conventional example and example was measured in the following manner. More specifically, the electrode material was subjected to chemical conversion at 250 V, 400 V, and 550 V in an aqueous boric acid solution (50 g/L), and then the electrostatic capacity was measured in an aqueous ammonium borate solution (3 g/L). The measured project area was 10 cm$^2$. Table 1 shows the results.

Figure 2:
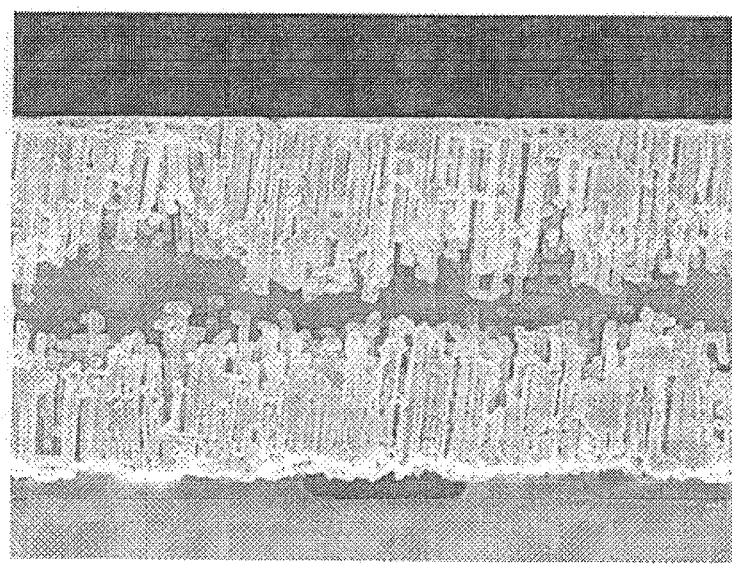
FIG. 2 shows an image of the cross section of an electrode material (after etching) obtained in Conventional Example 1 observed with a scanning electron microscope.

FIGS. 1 and 2 respectively show images of the cross sections of the electrode (electrode material) obtained in Example 1 and of the electrode material (after etching) obtained in Conventional Example 1 observed with a scanning electron microscope. As is clear from the drawings, the electrode material of the present invention is completely different from the conventional etched foil in structure, and comprises a porous sintered body in which particles are three-dimensionally sintered to each other.

TABLE 1

| | Electrostatic capacity (μF/10 cm$^2$) | | |
| --- | --- | --- | --- |
| | 250 V | 400 V | 550 V |
| Conventional Example 1 | 21.15 | 10.72 | 4.81 |
| Example 1 | 22.62 | 11.04 | 5.24 |

Table 1 demonstrates that the electrode of the present invention exhibits performance equivalent to or greater than that of the conventional etched foil.

The invention claimed is:

1. A method for producing a medium- to high-voltage aluminum electrolytic capacitor including an electrode and an electrolyte,
wherein an electrode material for the electrode is produced by a method comprising the steps of:
Step (1): forming a film made from a composition comprising a powder of at least one of aluminum and an aluminum alloy on a substrate; and
Step (2): sintering the film at a temperature not lower than 560° C. and not higher than 660° C. so that particles of the powder of at least one of aluminum and an aluminum alloy maintain a space between each particle;
the method being free from an etching treatment,
the method comprising a degreasing treatment after Step (1) and prior to Step (2), at a temperature within a range of not lower than 100° C. to not higher than 600° C. and the temperature is maintained for not less than 5 hours, and
a porosity of the resulting sintered body is determined by a target electrostatic capacity, and is not less than 10%, and the powder having an average particle diameter of not less than 1 μm and not more than 80 μm,
wherein the porosity is controlled by controlling a particle diameter of the powder of at least one of aluminum and an aluminum alloy.

2. The production method according to claim 1, wherein the composition comprises at least one member selected from the group consisting of resin binders and solvents.

3. The method according to claim 1, further comprising the step of forming a capacitor element by laminating an anode foil using the electrode material and a cathode foil with a separator therebetween, and winding the resulting laminate.

4. A method for producing a medium- to high-voltage aluminum electrolytic capacitor including an electrode and an electrolyte,
wherein the electrode is produced by a method comprising the steps of:
Step (1): forming a film made from a pasty composition comprising a powder of at least one of aluminum and an aluminum alloy on a substrate; and
Step (2): sintering the film at a temperature not lower than 560° C. and not higher than 660° C. so that particles of the powder of at least one of aluminum and an aluminum alloy maintain a space between each particle;
the method being free from an etching treatment,
the method comprising a degreasing treatment after Step (1) and prior to Step (2), at a temperature within a range of not lower than 100° C. to not higher than 600° C. and the temperature is maintained for not less than 5 hours, and a porosity of the resulting sintered body is determined by a target electrostatic capacity, and is not less than 10%, and the powder having an average particle diameter of not less than 1 μm and not more than 80 μm, wherein the porosity is controlled by controlling a particle diameter of the powder of at least one of aluminum and an aluminum alloy.

5. The production method according to claim 4, which further comprises step (3): anodizing the sintered film.

6. The method according to claim 4, further comprising the step of forming a capacitor element by laminating an anode foil using the electrode material and a cathode foil with a separator therebetween, and winding the resulting laminate.

* * * * *